United States Patent [19]

Barton et al.

[11] Patent Number: 4,965,104

[45] Date of Patent: Oct. 23, 1990

[54] CONTAINERS FOR LIQUID HYDROCARBONS

[75] Inventors: Roger E. C. Barton; Adriaan W. Van Breen; Ebel Klei, all of Amsterdam, Netherlands

[73] Assignee: Shell Oil Company, Houston, Tex.

[21] Appl. No.: 261,449

[22] Filed: Oct. 24, 1988

[30] Foreign Application Priority Data

Feb. 16, 1988 [GB] United Kingdom ............... 8803536

[51] Int. Cl.$^5$ ............................................. B29D 22/00
[52] U.S. Cl. .................................. 428/34.1; 428/35.7; 428/500; 428/384; 428/911
[58] Field of Search ...................... 428/35.7, 500, 911, 428/34.1; 528/384

[56] References Cited

U.S. PATENT DOCUMENTS

| | | | |
|---|---|---|---|
| 3,647,613 | 3/1972 | Scotland | 161/165 |
| 3,979,367 | 9/1976 | Kiovsky et al. | 260/79.5 |
| 4,543,446 | 9/1985 | Loomis | 525/539 |
| 4,574,974 | 3/1986 | von Holdt | 220/306 |
| 4,808,697 | 2/1989 | Drent | 528/382 |

FOREIGN PATENT DOCUMENTS

| | | |
|---|---|---|
| 0137332 | 9/1983 | European Pat. Off. . |
| 0220765 | 5/1987 | European Pat. Off. . |
| 0229408 | 7/1987 | European Pat. Off. . |
| 0235865 | 9/1987 | European Pat. Off. . |
| 0213671 | 11/1987 | European Pat. Off. . |
| 0251373 | 1/1988 | European Pat. Off. . |
| 0264159 | 4/1988 | European Pat. Off. . |
| 0269154 | 6/1988 | European Pat. Off. . |
| 0272727 | 6/1988 | European Pat. Off. . |

*Primary Examiner*—Edith Buffalow

[57] ABSTRACT

A closable thermoplastic container for holding or conveying liquid hydrocarbon fuels and organic solvents, characterized in that at least those parts of said container which will come in contact with the liquid hydrocarbon fuels and organic solvents, is based on copolymers of CO or $SO_2$, which polymers have been prepared by polymerization of CO or $SO_2$ with at least one olefinically unsaturated compound A, and which polymers are made up of units —CO—(A')— respectively —$SO_2$—(A')— and in such a manner that the adjacent —CO— respectively —$SO_2$— units are separated by a single unit A', wherein the, or each, A' represents a monomer unit originating a compound A.

6 Claims, No Drawings

CONTAINERS FOR LIQUID HYDROCARBONS

BACKGROUND OF THE INVENTION

The present invention relates to thermoplastic containers for holding or conveying liquid hydrocarbons.

Thermoplastic containers for holding or conveying liquid hydrocarbons are known and include jerrycans and fuel tanks.

Thermoplastic polymers which may be used in the preparation of thermoplastic containers, generally combine good mechanical properties with a good resistance towards organic liquids and especially liquid hydrocarbons. With the latter property there appears to be a correlation between the nature of the organic liquid and the polymer composition. It is known for instance that the resistance of the relatively expensive polyamides, such as Nylon-6, towards liquid hydrocarbons or liquid hydrocarbon compositions is generally superior to that of the relatively cheap hydrocarbon polymers, such as high density polyethylene and polypropylene. Methods are known however for upgrading the resistance of hydrocarbon polymers, and articles made therefrom, to liquid hydrocarbons. In Netherlands Patent Application No. 6901487, a method has been described wherein the performance of polyethylene containers for gasoline, is improved by giving the inside of said containers a post-fluorination treatment. Although the resistance of the fluorinated polyethylene container to petrol was indeed increased, this method as such is very impractical for large scale production as well as disadvantageous from the economy point of view.

Hence it can be concluded that there is room for improvement in the production of thermoplastic containers for holding or conveying liquid hydrocarbons or liquid hydrocarbon compositions, especially as regards the thermoplastic polymer material.

SUMMARY OF THE INVENTION

The invention relates to closable thermoplastic containers for holding or conveying liquid hydrocarbon fuels and organic solvents, characterized in that at least those parts of the containers which will come in contact with the liquid hydrocarbon fuels or organic solvents, are based on copolymers of CO or $SO_2$, which copolymers have been prepared by polymerization of CO or $SO_2$ with at least one olefinically unsaturated compound A, and wherein the polymers are made up of units —CO—(A')— respectively —$SO_2$(A')— and in such a manner that the adjacent —CO— respectively —$SO_2$— units are separated by a single unit A', wherein each A' represents a monomer unit originating in a compound A.

DESCRIPTION OF THE PREFERRED EMBODIMENT

An investigation by the Applicants into the performance aspects of some recently prepared polymers, has shown that selected copolymers of carbon monoxide (CO) or sulfur dioxide ($SO_2$) and olefinically unsaturated compounds, combine good mechanical performance properties with very good resistance to organic liquids, such as to liquid hydrocarbons and polar solvents, thus making them very suitable for the production of containers for holding or conveying liquid hydrocarbon fuels or organic solvents. In view of the inflammability of such organic liquids, the containers as mentioned hereinbefore should be provided with a means for closing.

Therefore, the invention provides closable thermoplastic containers for holding or conveying liquid hydrocarbon fuels or organic solvents, characterized in that at least those parts of said containers which will come in contact with the liquid hydrocarbon fuels or organic solvents are based on copolymers of CO or $SO_2$, which copolymers have been prepared by polymerization of CO or $SO_2$ with at least one olefinically unsaturated compound A, and which polymers have a linear structure and are made up of alternating units of —CO—(A')— respectively —$SO_2$—(A')— and in such a manner that the adjacent —CO— respectively —$SO_2$— units are separated by a single unit A', wherein the, or each, A' represents a monomer unit originating in a compound A.

The olefinically unsaturated compounds A from which the hereinbefore mentioned CO or $SO_2$ polymers may be derived, include olefinically unsaturated compounds which consist exclusively of carbon and hydrogen, as well as olefinically unsaturated compounds which in addition to carbon and hydrogen contain one or more hetero atoms per molecule. Eligible olefinically unsaturated compounds consisting exclusively of carbon and hydrogen include ethylene, propylene, 1-butene, 2-butene, isobutene, 1-hexene, 1-octene, 1-dodecene, styrene, 2-methylstyrene, 4-methylstyrene, 4-ethylstyrene, norbornene, and dicyclopentadiene. Eligible olefinically unsaturated compounds containing at least one hetero atom as mentioned hereinbefore, include vinyl acetate, allyl acetate, vinyl ethyl ether, methyl acrylate, methyl methacrylate, 10-undecenoic acid, methyl 10-undecenoate, 10-undecenol-1, 6-chloro hexene-1, 4-methoxy styrene and 4-chloro styrene. The lower molecular weight α-olefins are preferred olefinically unsaturated compounds A.

Of the many CO and $SO_2$ copolymers which can be obtained via polymerization of CO and $SO_2$ with at least one olefinically unsaturated compound A, as hereinbefore described, the CO copolymers and terpolymers are preferred. When the CO polymer is a copolymer, the CO-ethylene copolymer is a preferred CO copolymer, and when the CO polymer is a terpolymer, a CO-ethylene-propylene terpolymer is a preferred terpolymer.

Processes for the preparation of the CO and $SO_2$ polymers, may suitably be employed in the preparation of the thermoplastic containers of the present invention, have been described, e.g., in Netherlands Patent Applications Nos. 8503395, 8602595, 8602733, 8603015, 8700987, and in European Patent Applications Nos. 0213671, 0220765, 0235865 and 0251373.

It is preferred that the weight average molecular weight of the CO and $SO_2$ polymers, which may be employed in the preparation of the containers of the present invention, is at least 17 000 as determined via Gel Permeation Chromatography.

It will be understood by those skilled in the art that with the thermoplastic containers of the present invention, it should be sufficient that those parts of said containers which will come in contact with the liquid hydrocarbon substance are based on the thermoplastic CO or $SO_2$ polymers, as hereinbefore described. However, in view of the ease of production, it is preferred that the whole container is based on said CO or $SO_2$ polymers.

If desired, one or more fillers, pigments, reinforcing fibers, stabilizers, antioxidants and other auxiliary compounds may be incorporated into the thermoplastic polymer material, on which the containers of the present invention are based.

The liquid hydrocarbon fuels which may conveniently be held or conveyed in the containers of the present invention, are considered to include fuels for automotive and aviation purposes as well as liquid hydrocarbons or hydrocarbon compositions for lubricating purposes. The organic solvents for which the containers may be used, include aromatic and aliphatic hydrocarbon solvents and mixtures thereof, as well as polar organic solvents. Suitable such solvents include toluene, xylene, white spirits, ethanol, mono- and polyethyleneglycols, glycolethers and the like.

The thermoplastic containers of the present invention which include jerry cans, fuel tanks, and bottles, may be prepared via known techniques such as blow molding, rotation molding, vacuum forming, injection molding, extrusion and the like.

The invention will be futher illustrated by the following example.

EXAMPLE

The suitability of a CO-ethylene copolymer and a CO-ethylene-propylene terpolymer (12% m propylene) for the preparation of containers for holding or conveying liquid hydrocarbon fuels and organic solvents, was determined by measuring the resistance of test samples made from these polymers, to different liquid hydrocarbon substances and to a number of polar organic solvents, as well as by measuring a number of important mechanical performance properties.

The test specimens required for the different tests were prepared via compression molding a disc-like test specimen at a temperature which was 30° C. above the melting point of the relevant polymer. The test specimens were allowed to condition (i.e., age) during 48 hours at 20° C. with a 50% relative humidity before testing.

Chemical resistance tests were conducted following ASTM D 570-81, wherein water was replaced with test liquids mentioned hereinafter and employing the disc-like test samples as specified in pt 4.1 of ASTM D 570-81.

Mechanical performance properties were measured, i.e., the yield strength, maximum tensile strength and the elongation at break were determined following DIN 53504 (Die S$_3$) while Izod impact strength was determined following ISO 180 (notch A type).

The results of the chemical resistance tests, which have been expressed as % weight increase after 1 week immersion, and are given in Table 1, while the data on the mechanical performance properties is given in Table 2.

COMPARATIVE EXPERIMENT

In order to assess how the different performance properties of the CO copolymer and terpolymer compared with those of the wellestablished thermoplastic polymers, such as high-density polyethylene, polypropylene and Nylon-6, the same chemical resistance properties as mentioned in the example hereinbefore, were also determined for the three named thermoplastic polymers. The results of these test have been included in Table 1.

As the mechanical performance properties of the three thermoplastic polymers have already been measured so many times and moreover have been widely published, some typical values for the relevant mechanical performance properties of these polymers have been included in Table 2, which values were taken from the 1987 Yearbook of the Modern Plastic Encyclopedia.

TABLE 1

|  | CO-Ethylene copolymer | CO-Ethylene-Propylene terpolymer | Nylon-6 | Polypropylene | High-density Polyethylene |
|---|---|---|---|---|---|
| Toluene | 0.1 | 0.4 | 1.0 | 12.5 | 9.8 |
| Gasoline | 0.2 | 0.1 | 0.9 | 13.0 | 9.4 |
| Motor oil | 0.1 | — | 0.7 | 0.3 | 0.4 |
| Diesel fuel | 0.2 | — | 0.7 | 1.0 | 2.5 |
| Mono ethylene glycol | —* | — | 1.5 | — | — |
| Ethanol | — | 0.8 | 20.0 | — | — |

*— indicates no weight increase after 1 week immersion.

TABLE 2

|  | CO-Ethylene copolymer | Co-Ethylene-Propylene terpolymer | Nylon-6 | Polypropylene | High-density Polyethylene |
|---|---|---|---|---|---|
| Melting Temp. °C. | 257 | 180 | 216 | 168 | 130–137 |
| Density g/cm$^3$ | 1.22 | 1.22 | 1.12–1.14 | 0.91 | 0.95–0.97 |
| Yield strength MPa | 68–80 | 45–75 | 35 | 37 | 33 |
| Max. Tensile Strength MPa | 80–85 | 70–82 | 69 | 41 | 31 |
| Elongation at break % | 150–280 | 300–410 | 300 | 600 | 1200 |
| Izod Impact Strength KJ/m$^2$ | >16 | 21–33 | 16 | 25 | 21 |

From the data given in Tables 1 and 2, it can be seen that the mechanical performance properties of the CO copolymer and terpolymer are at least on a par with those of the three commercial thermoplastic polymers, while the resistance to attack by liquid hydrocarbon substances as well as by polar organic solvents, is far superior to that of any one of the three other polymers. It can thus be concluded that the CO copolymer and terpolymers are eminently suitable for the preparation of containers for holding or conveying liquid hydrocarbons, but also for more polar organic liquids.

What is claimed is:

1. A thermoplastic container containing a liquid hydrocarbon fuel, characterized in that a portion of the container in contact with said liquid hydrocarbon fuel is based on copolymers of CO or SO$_2$, which copolymers have been prepared by polymerization of CO or SO$_2$ with at least one olefinically unsaturated compound A, and which polymers are made up of units —CO—(A′)— respectively —SO$_2$(A′)— and in such a manner that the adjacent —CO— respectively —SO$_2$— units are separated by a single unit A′, wherein the, or each, A′ represent a monomer unit originating in a compound A, and further characterized in that the percentage weight increase after one week immersion in gasoline is at least two times less than the percentage weight increase of Nylon-6, polypropylene, or high density polyethylene after a one week immersion in gasoline.

2. The closable container as claimed in claim 1, wherein the compound A consists exclusively of carbon and hydrogen.

3. The closable container as claimed in claim 2, wherein the carbon and hydrogen based compound A is a lower α-olefin.

4. The closable container as claimed in claim 1, wherein the compound A contains in addition to carbon and hydrogen one or more hetero atoms.

5. The closable container as claimed in any one of claims 1-4, wherein the CO copolymer is a CO-ethylene copolymer or a CO-ethylene-propylene terpolymer.

6. The closable container as claimed in claim 1, wherein the whole container is based on a thermoplastic CO or $SO_2$ polymer.

* * * * *